United States Patent [19]

Ballou et al.

[11] 4,012,962
[45] Mar. 22, 1977

[54] ENDLESS POWER TRANSMISSION BELT STRUCTURE

[75] Inventors: David G. Ballou, Ozark; Clinton L. Bishop, Springfield; Toby K. Pope, Willard, all of Mo.

[73] Assignee: Dayco Corporation, Dayton, Ohio

[22] Filed: Mar. 15, 1976

[21] Appl. No.: 667,235

Related U.S. Application Data

[63] Continuation-in-part of Ser. No. 490,828, July 22, 1974, abandoned.

[52] U.S. Cl. ............................... 74/233; 156/139; 156/140
[51] Int. Cl.² .................... F16G 5/16; B29H 7/22
[58] Field of Search ............... 74/231 P, 233, 234; 156/139, 140

[56] References Cited

UNITED STATES PATENTS

| 3,416,383 | 12/1968 | Jensen et al. | 74/233 |
| 3,930,417 | 1/1976 | Ballou | 74/231 P |

FOREIGN PATENTS OR APPLICATIONS

| 1,171,685 | 11/1969 | United Kingdom | 428/910 |

*Primary Examiner*—Leonard H. Gerin
*Attorney, Agent, or Firm*—Reuben Wolk

[57] ABSTRACT

An endless power transmission belt structure is provided and made of a thermoplastic elastomer having an oriented crystalline structure about substantially its entire endless path, and oriented only along this path.

11 Claims, 8 Drawing Figures

ENDLESS POWER TRANSMISSION BELT STRUCTURE

RELATED APPLICATION

This application is a continuation-in-part of U.S. application Ser. No. 490,828, filed July 22, 1974, now abandoned.

BACKGROUND OF THE INVENTION

There are numerous endless power transmission belts in current use which are made of various elastomeric materials and such currently used belts include belts which are deficient because they can only operate over a comparatively narrow temperature range, other belts which have a comparatively low coefficient of friction, still others which tend to build up in temperature excessive amounts during operation, and others which have poor strength whereby considerable effort, at added costs, has been made to correct these deficiencies.

SUMMARY

This invention provides an improved endless power transmission belt structure and method of making same which may be in the form of a complete belt or a component of such belt such as its load-carrying section wherein the belt structure is made of a thermoplastic elastomer preferably in the form of a thermoplastic polyester elastomer and such belt is economical to produce, has exceptional strength, has improved flexibility, has a comparatively high coefficient of friction, has a low heat build-up during operation, and is capable of operating over a broad range of temperature due to an oriented crystalline structure which it has about substantially its entire endless path, and only along this path.

Other details, uses, and advantages of this invention will be readily apparent from the embodiments thereof presented in the following specification, claims, and drawings.

BRIEF DESCRIPTION OF THE DRAWINGS

The accompanying drawings show present preferred embodiments of this invention, in which.

DESCRIPTION OF ILLUSTRATED EMBODIMENTS

Figure 1:
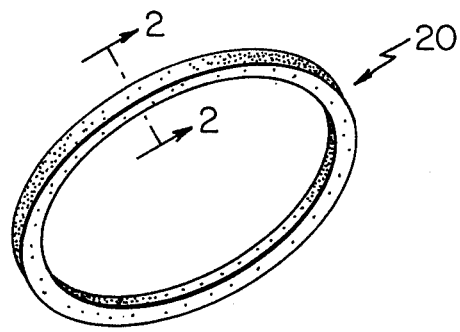
FIG. 1 is a perspective view illustrating one exemplary embodiment of an endless power transmission belt structure of this invention in the form of an entire belt.
Figure 2:
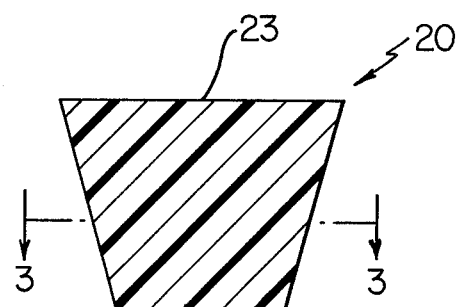
FIG. 2 is a cross-sectional view of the belt structure taken on the line 2—2 of FIG. 1.

Reference is now made to FIGS. 1-2 of the drawings which illustrate one exemplary embodiment of a power transmission belt structure of this invention and such belt structure is in the form of an entire endless power transmission belt of substantially trapezoidal cross section which is designated generally by the reference numeral 20. The belt 20 is homogeneous and is made of a thermoplastic elastomer; and, as will be apparent from the schematic presentation at 21 in FIG. 3, the thermoplastic polyester elastomer has an oriented crystalline structure about its entire endless path, but the orientation occurs only along this endless path and in no other direction. The length of the endless path is defined as the developed or total length of the endless belt measured at any point along the cross section thereof and for convenience such length may be considered as the developed length of the outside surface 23 of its wide parallel side and such developed length is generally of the order of several times the length of a member 24 illustrated in fragmentary view in FIG. 4 and utilized to define the belt structure or completed belt 20.

Figure 8:
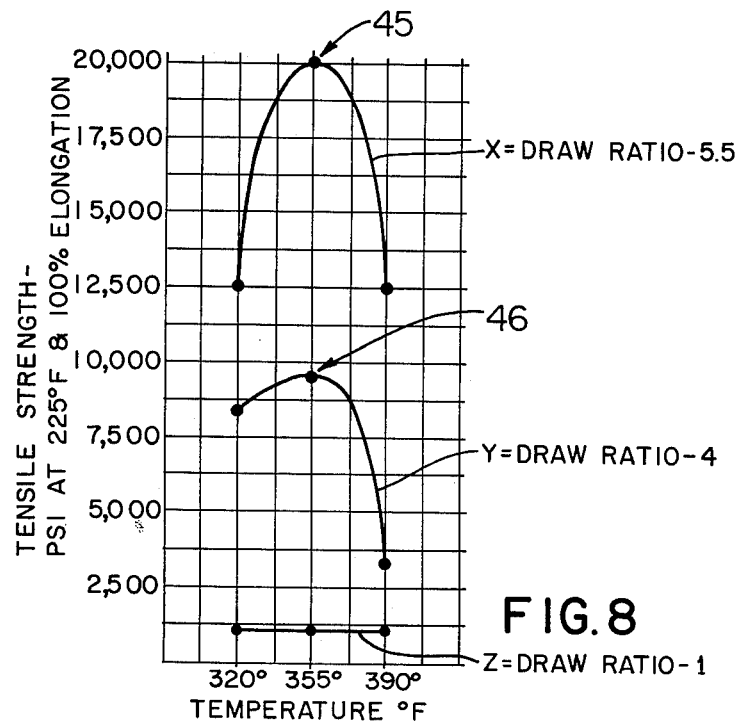
FIG. 8 is a graph comparing the tensile strength of belt structure samples of this invention having an oriented crystalline structure with a sample having an unoriented crystalline structure.

The endless path of the belt 20 preferably has a length ranging between 2 and 7 times the length of the member 24 used to define the belt 20 and such length is provided by forming action in a manner to be described in more detail subsequently whereby the unoriented crystalline structure at 24 becomes oriented only along its endless path after forming, and in no other direction. The resulting belt structure has a comparatively great strength and is capable of providing improved performance. For example, the tensile strength of the completed belt 20 is such that it is generally of the order of ten times the tensile strength of the member 24 used to define the belt structure or belt 20, see FIG. 8.

Figure 5:
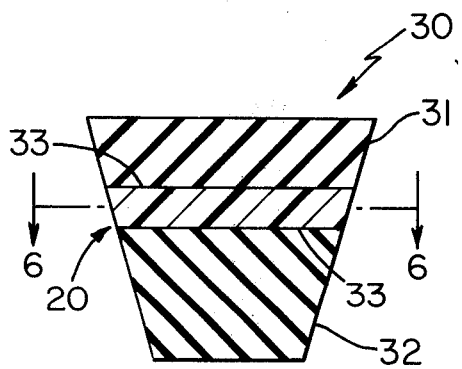
FIG. 5 is a cross-sectional view illustrating an exemplary belt which utilizes an endless power transmission belt structure of this invention to define its load-carrying section.
Figure 6:
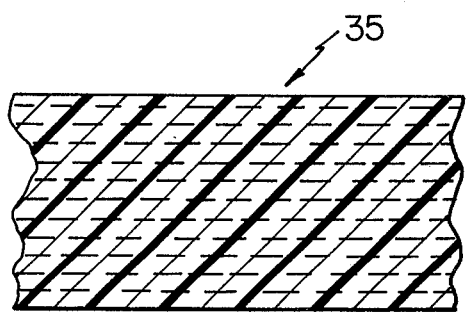
FIG. 6 is a view similar to FIG. 3 particularly illustrating the oriented crystalline structure of the load-carrying section of the belt of FIG. 5.

Another exemplary embodiment of this invention is illustrated in FIGS. 5-6 of the drawings and is in the form of an endless power transmission belt construction or belt which is designated generally by the reference numeral 30 and comprises a belt structure which in the belt 30 is defined as a load-carrying section of such belt and such load-carrying section is designated by the reference numeral 20. The belt 30 also has a tension section 31 and a compression section 32 bonded on opposite sides of the load-carrying section by suitable adhesive means 33.

Any suitable adhesive means 33 may be used which is compatible with the thermoplastic elastomer used to make section 20 and sections 31 and 32. The sections 31 and 32 are preferably made of elastomeric materials and in this example are shown made of rubber compounds whereby the adhesive means 33 is preferably an isocyanate adhesive 33.

In a similar manner as described for the entire belt 20 of FIG. 1, the belt structure or load-carrying section 20 of FIG. 5 is homogeneous and is also made of a thermoplastic elastomer, preferably in the form of a thermoplastic polyester elastomer and has an oriented crystalline structure about substantially its entire endless path and with such crystalline structure being indicated in FIG. 6 at 35. As in the belt 20, the section 20 is also oriented only along its endless path and in no other direction.

The belt structure 20 regardless of whether it is used to define the complete endless power transmission belt 20 shown in FIG. 1 or whether it defines the load-carrying section 20 of the belt 30 of FIG. 5 is made in a similar manner and the method steps employed to make sure belt structure 20 will now be described in detail and for this description, particular reference is made to FIG. 7 of the drawings wherein certain steps are illustrated.

Figure 7:
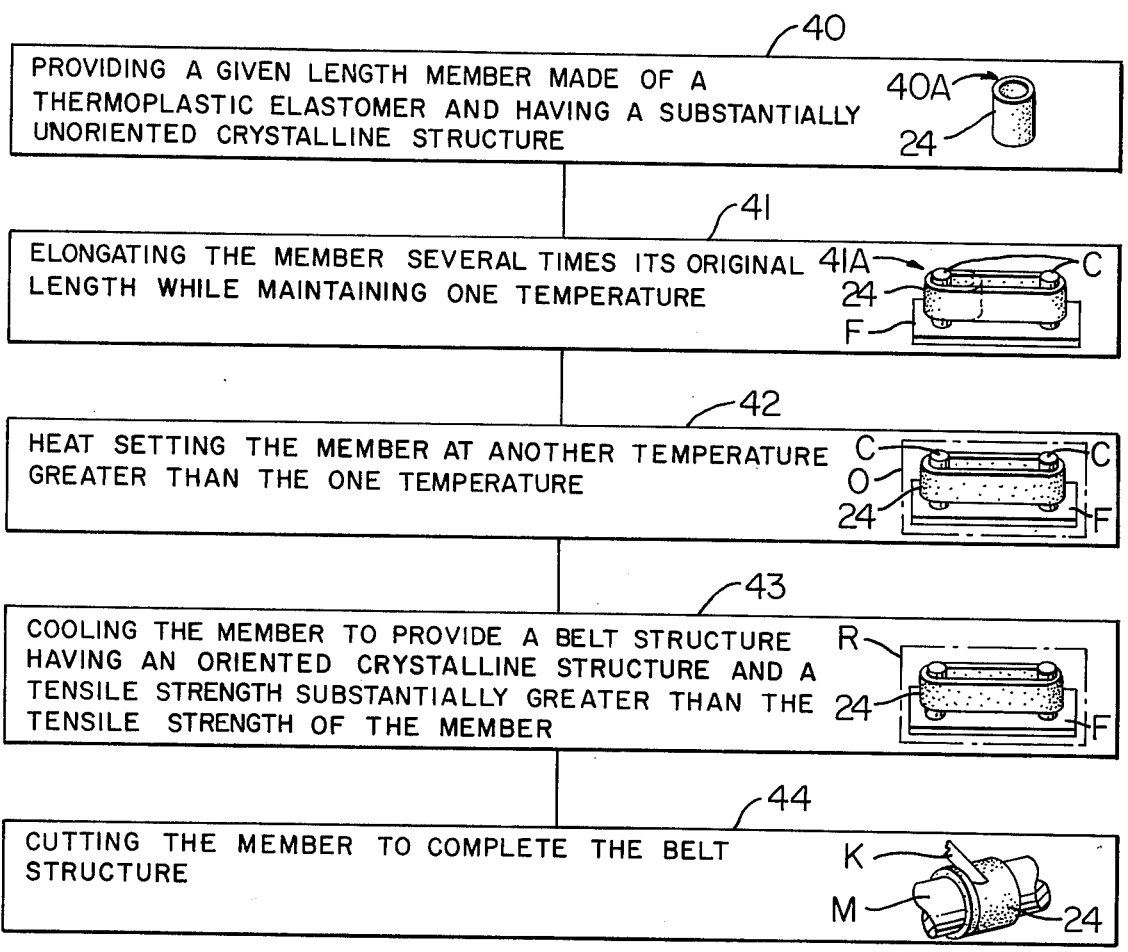
FIG. 7 is a block diagram presentation of the method of this invention which may be employed to define the endless power transmission belt structure in the form of the entire belt of FIG. 1 or the load-carrying section of a belt as shown in FIG. 5 and also schematically illustrating each step in each block.

In particular, it will be seen as shown by the block at 40 in FIG. 7, that a given length member 24 made of a thermoplastic elastomer and having a substantially unoriented crystalline structure is provided and the member 24 is in the form of a sleeve as shown at 40A in the block at 40. The member 24 provided at 40 is then suitably formed as indicated by the blocks 41, 42, and 43 thereby increasing its length several times while simultaneously orienting its crystalline structure to thereby provide a belt structure 20 which is used either as the complete belt 20 of FIG. 1 or the load-carrying section 20 of FIG. 5 with such belt structure 20 having a tensile strength substantially greater than the tensile strength of the member 24.

The various steps comprising the forming action will now be described in detail and comprise the step illustrated by the block at 41 of elongating the sleeve member 24 several times its original length at one temperature. The elongating action is achieved as shown at 41A by a pair of capstans C, or similar devices, supported on a movable fixture F and means (not shown) of known construction are provided as a part of the fixture F for stretching the member 24 several times its length and from the dotted line position at 41A to the solid line position illustrated.

The elongated member 24 is then heat-set at another temperature as indicated by the block at 42 with the said other temperature being greater than the one temperature indicated at 41. The heat setting is achieved by placing, or otherwise moving, the fixture F with the sleeve stretched around the capstans C into a heated environment such as a tunnel or controlled temperature oven O.

Figure 3:
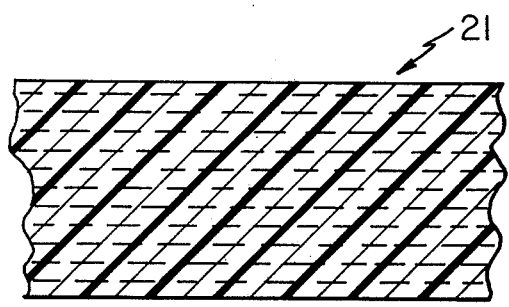
FIG. 3 is a fragmentary view taken essentially on the line 3—3 of FIG. 1 and schematically illustrating the oriented crystalline structure of the thermoplastic elastomeric material comprising the belt structure of FIG. 1.
Figure 4:
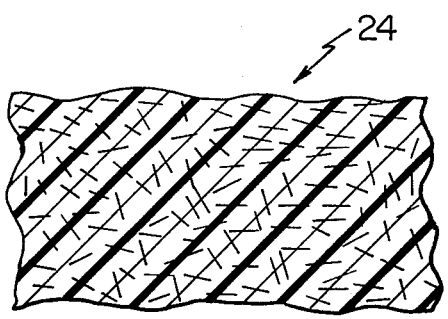
FIG. 4 is a fragmentary view similar to FIG. 3 particularly illustrating a member made of a thermoplastic elastomer and used to define the belt structure of FIG. 1 prior to forming such member and illustrating the comparatively highly unoriented crystalline structure thereof.

The member 24 is then cooled to provide a belt structure as indicated by the block at 43 whereupon such belt structure has an oriented crystalline structure essentially as illustrated at 21 in FIG. 3 and 35 in FIG. 6 and such cooled belt structure has a tensile strength of the member 24 originally provided at 40 in FIG. 7. The cooling action may be provided in any suitable manner such as by transferring the fixture F and stretched belt into a cool environment or room R whereupon the stretched member 24 is allowed to set and cool or is cooled by circulating a fluid medium therearound until it reaches normal room ambient temperature.

The elongated, heat set, and cooled member 24 is then cut as indicated by the block at 44; and, the cutting action may be achieved using any suitable cutting means such as a knife K while supporting the sleeve member 24 on a rotatable mandrel M. The mandrel M may be suitably rotated while bringing the knife K into cutting engagement.

The elongating step illustrated at 41 may be provided at a temperature ranging from normal ambient temperature at the given locale in which the method is being carried out to a temperature of approximately 250° F. Preferably the elongating or stretching is achieved with the member at a normal ambient temperature of roughly 72° F whereby the elongation or drawing action is considered a cold elongating, stretching, or drawing action.

The elongating action indicated at 41 is peferably such that the original member 24 is reduced in cross section and increased in length with the elongation being such that the member is stretched several times, i.e., 2 to 7 times, its original length. The elongation is preferably carried out so that the member is elongated from 4 to 5.5 times its original length.

The elongated member 24 is then preferably heat set, as indicated at 42 at another temperature greater than the temperature at which it was elongated or drawn, preferably the heat setting is such that it is achieved at a temperature which is approximately 300° F below the crystalline melting temperature of the particular thermoplastic elastomer being used.

The heat setting step as indicated at 42 in FIG. 7 is preferably carried out for a predetermined time period and this time period may vary depending upon the particular thermoplastic elastomer used; however, it has been found that by elongating the member 24 from two to seven times its original length and heat setting at a temperature approximately 300° F below the crystalline melting temperature of the thermoplastic elastomer, good results are obtained when the heat setting ranges between 10 and 50 minutes and best results at a time period between 20 to 30 minutes.

The completed belt structure 20 has an oriented crystalline structure along the endless path of the belt as illustrated at 21 in FIG. 3 and 35 in FIG. 6 and such belt structure has unexpected strength. Considering tensile strength alone, in one application of this invention a thermoplastic polyester elastomer was employed and a structure 20 labeled as sample X was made utilizing the method steps of FIG. 7. The elongating step of 41 provided elongation of 5.5 times the original length of the member 24 at 72° F whereupon the tensile strength of structure 20 at 225° F and 100% elongation of the member was 20,000 psi after having heat-set the member at a temperature of 355° F for a period of 30 minutes, and as shown at 45 in FIG. 8. This 20,000 psi tensile strength may be compared with a structure 20 labeled as sample Y which was elongated at 72° F 4 times the original length of member 24 and had a tensile strength of 9700 psi at 225° F and 100% elongation after having heat-set the member 24 at 355° F for 30 minutes and as shown at 46. Sample Z represents an unstretched member 24 which has been heat-set at the temperatures indicated for 30 minutes and its tensile strength indicated. The tensile strength of samples X and Y should also be noted after heat setting at other temperatures for 30 minutes and as noted on the graph of FIG. 8.

The member 24 used to make the belt structure 20 whether in the form of a completed belt or a load-carrying section of a belt is preferably made utilizing an extruded tubular sleeve of the thermoplastic elastomer and elongation is achieved utilizing the capstans C, or the like, of known construction whereupon the tubular sleeve is expanded or increased in diameter and hence increased in overall circumferential length while maintaining a homogenous character throughout its entire length. In addition, the capstans or elongating devices may be employed to provide an elongating action in more than one step. For example, comparatively small capstans may be employed to provide one degree of elongation and a sleeve 24 of intermediate length defined whereupon the intermediate length sleeve 24 may be transferred to larger capstans and elongated, drawn, or stretched to its final length and in accordance with techniques which are known in the art and do not require further elaboration.

It will be appreciated that the same basic detailed steps are followed in defining the belt structure 20 of FIG. 1 or of FIG. 5. However, in defining the structure 20 of FIG. 5 the cutting action at 44 may be deferred and steps carried out as follows. For example, a suitable elastomeric material such as a rubber compound used to define compression section 32 is built up on a drum according to the techniques known in the art whereupon the exposed surface of the layer defining the compression section 32 is coated with a suitable adhesive 33. The elongated, heat-set, and cooled sleeve 24 defined essentially as described at 43 in FIG. 7 is then placed concentrically around the compression section 32 against adhesive 33. Another layer of adhesive 33 is placed on the outside surface of the concentrically placed sleeve and a suitable elastomeric material such as a rubber compound used to define tension section 31 is built up around and against this newly added layer of adhesive 33 to define a sleeve assembly in accordance with presently used techniques. This sleeve assembly is cured in accordance with known techniques and cut to define the completed belt 30 or actually a plurality of such belts. It will be appreciated that the overall thickness of the belt 30, the relative thickness as viewed in cross section of the belt structure 20, tension section 31, and compression section 32 may be varied, as desired, for various applications.

The cutting action to define belts 20 or 30 may be achieved either by a conventional knife K, as shown at 44, or by a grinding operation.

The belt structure of this invention whether in the form of the completed belt 20 of FIG. 1 or the load-carrying section 20 comprising the belt 30 has improved load-carrying capacity for a given cross-sectional area; yet, such belt structure 20 has no significant loss of flexibility when compared with a conventional belt. In addition, in making the belt structure 20, there is no scrap due to the fact that the thermoplastic material used to make the belt structure can be reused.

In this disclosure the member 24 which is provided as indicated at 40 is in the form of a tubular or sleeve-like member and such tubular member may be made using any technique known in the art including casting, extrusion through an annular orifice or the like. The stretching has been illustrated and described a 41 in FIG. 7 using such a tubular or sleeve-like member.

However, it will be appreciated that a straight elongated strip or ribbon-like member 24 may be stretched, as desired, to several times (2-7 times) its original length and then heat set, cooled, and heat fused in an endless path to arrive at a sleeve-like member such as provided at the end of the step at 43 whereupon the sleeve-like member may be cut as described before to define belt 20 or further used to define belt 30.

Any suitable thermoplastic elastomer may be employed to make the belt structure 20, however, the belt structure 20 is preferably made using a high performance thermoplastic polyester elastomer sold under the trademark of "Hytrel" by the E. I. DuPont de Nemours Company of Wilmington, Del.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt structure comprising a thermoplastic polyester elastomer having an oriented crystalline structure about substantially its entire endless path, said crystalline structure being oriented only along said endless path.

2. A belt structure as set forth in claim 1 and defined as a load-carrying section of an endless power transmission belt and further comprising a tension section and a compression section bonded on opposite sides of said load-carrying section.

3. A belt structure as set forth in claim 1 defined as an entire power transmission belt.

4. An endless power transmission belt structure consisting of a thermoplastic polyester elastomer having an elongated oriented crystalline structure about substantially its entire endless path, said endless path having a length several times its original length prior to elongation, said crystalline structure being oriented only along said endless path.

5. A belt structure as set forth in claim 4 in which said endless path has a length which ranges between 2 and 7 times its original length.

6. A belt structure as set forth in claim 4 having a tensile strength generally of the order of ten times the tensile strength of said member due to said oriented crystalline structure.

7. A belt structure as set forth in claim 4 defined as an entire power transmission belt.

8. A belt structure as set fort in claim 4 defined as a load-carrying section of an endless power transmission belt and further comprising a tension section and a compression section bonded on opposite sides of said load-carrying section.

9. A belt structure as set forth in claim 8 in which said tension and compression sections comprise rubber compounds and further comprising adhesive means bonding said tension and compression sections on opposite sides of said load-carrying section.

10. A belt structure as set forth in claim 9 in which said adhesive means is in the form of an isocyanate adhesive.

11. A belt structure as set forth in claim 4 in which said oriented crystalline structure is completely free of fused areas.

* * * * *